Figure 1:
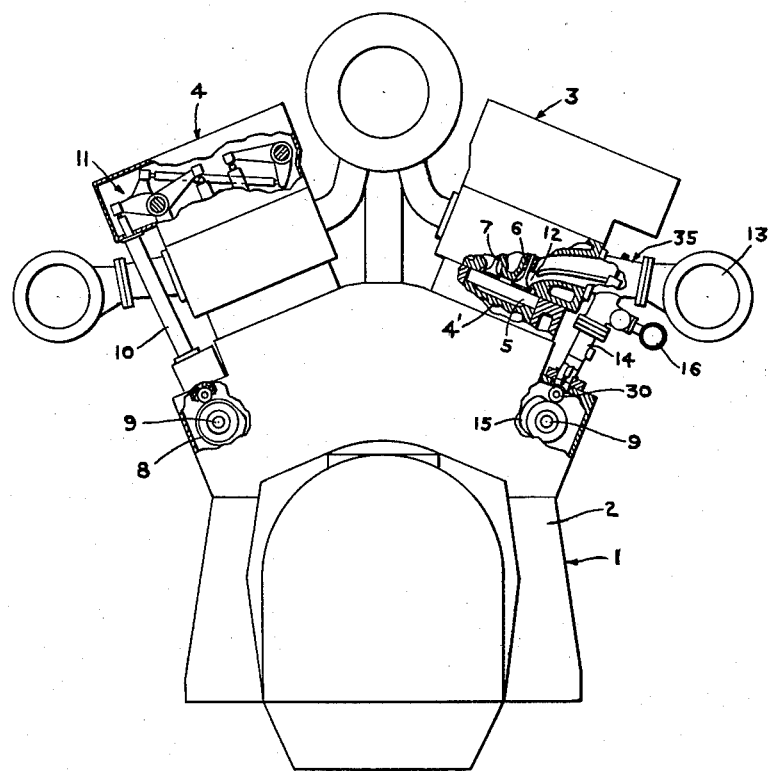

March 17, 1964 W. M. KAUFFMANN 3,125,085
CONTROL OF FUEL INTRODUCTION TO ENGINE CYLINDER
Filed June 28, 1962 2 Sheets-Sheet 1

WILLIAM M. KAUFFMANN
INVENTOR.

BY Daniel D. Bobis
Atty

WILLIAM M. KAUFFMANN
INVENTOR.

BY Daniel H. Bobis
atty

United States Patent Office 3,125,085
Patented Mar. 17, 1964

3,125,085
CONTROL OF FUEL INTRODUCTION TO
ENGINE CYLINDER
William M. Kauffmann, Hamburg, N.Y., assignor to
Worthington Corporation, Harrison, N.J., a corporation of New Jersey
Filed June 28, 1962, Ser. No. 205,919
5 Claims. (Cl. 123—120)

The present invention relates to an internal combustion engine construction and more particularly provides means for controlling the introduction of fuel in an engine burning high hydrogen content gases which are normally prone to backfiring if used with conventional engine gas admission methods.

Certain types of applications, such as refineries or synthetic ammonia and chemical process plants, provide fuel gas for engine use that may be of extremely high hydrogen content. The amount varies from 50% to 80% of the total fuel value. The effect of the hydrogen is to depress the heat value of the fuel as well as introduce an element having one of the highest flame velocities. In addition and due to the low density of hydrogen and its high flame velocity, diffusion properties of such fuel gases are detrimental to proper combustion control.

In conventional turbo-charged engines the fuel gas admission valve is about centrally located between the intake air manifold and valve inlet orifice to the combustion chamber of the engine cylinder. As a result of the foregoing characteristics of hydrogen the fuel gas including hydrogen will disburse into the intake air manifold and become ignited by the residual flame of an adjacent cylinder during its overlap sequence of valve timing.

The charge in the intake air manifold is fired with the resultant violent combustion characteristics termed backfiring in the art. In addition and because of the foregoing characteristics attributable to hydrogen in the fuel supply, unburned raw gas may enter the exhaust manifold and may be ignited by exhaust gases of other cylinders. Such a condition will cause an explosion in the exhaust manifold which will enter such cylinders of the engine as are passing through the overlap sequence e.g. exhaust and inlet valve open, thus permitting flame to enter the intake air manifold system. The flame will thusly ignite high hydrogen gas in either the intake air manifold or inlet valve passage and form a backfiring condition of rather violent magnitude.

In accordance with the present invention a gaseous fuel injection valve is provided which acts to control the introduction of the fuel including hydrogen into the inlet portions of the main inlet valve. More particularly opening of the gaseous fuel injection valve is delayed for about five seconds after the close of the exhaust valve. In addition the gaseous fuel injection valve is provided with an enclosure or chamber and passage means interconnecting the chamber with the inlet portion of the valve inlet. As is usual separate cams are set on the engine cam shaft to operate these valves as desired.

Accordingly it is an object of this invention to provide an improved control for introducing fuel to the engine cylinder.

It is another object of this invention to provide means for preventing the diffusion of hydrogen into the intake air manifold system.

It is another object of this invention to so time the gas admission so that it does not occur until the overlap sequence of the individual cylinder is terminated.

It is a further object of this invention to provide a gaseous fuel injection arrangement which overcomes the objections mentioned hereinabove.

Figure 2:
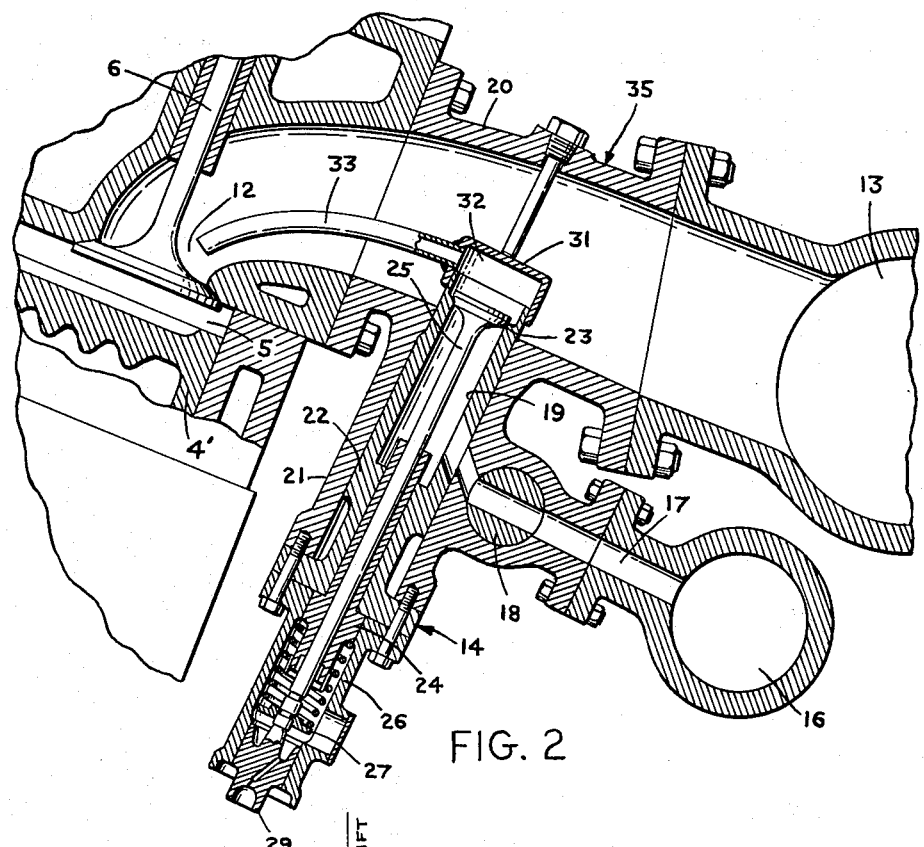
Figure 3:
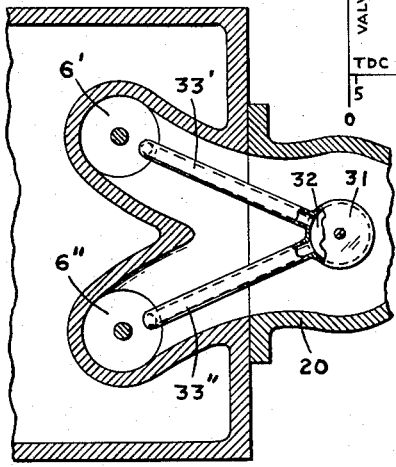
Figure 4:
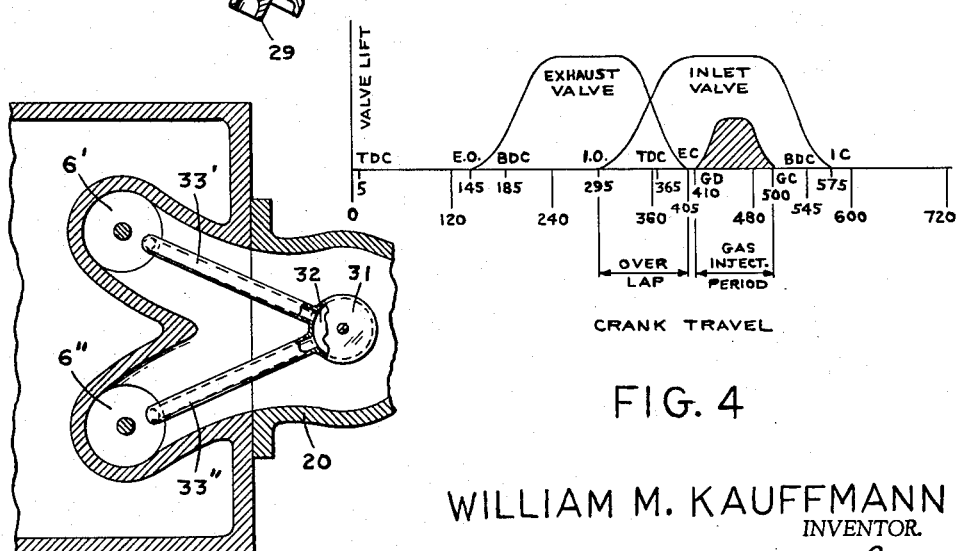

Other objects and advantages of the invention including the basic design and the nature of the improvements thereon will appear from the following description taken in conjunction with the following drawings, in which:

FIGURE 1 is a side elevation partly in section of a gas engine including the subject matter of the present invention, FIGURE 2 is an enlarged section showing the gaseous fuel injection valve of the present invention, FIGURE 3 is a top section taken through the intake air manifold of an engine including at least two main inlet valves, FIGURE 4 is a diagram illustrating the inlet, gas injection, and exhaust valve lift areas vs. the crankshaft travel or timing for a gas engine embodying the present invention.

Now referring particularly to FIGURE 1, a section of a spark ignition turbo-charged gas engine generally designated 1 is shown as comprising the usual frame 2 having mounted thereon the V-line cylinder banks generally designated 3 and 4. As is well known the piston 4' is driven through the usual rod and crank shaft arrangement (not shown). Each of these cylinders generally designated 5 (and as is shown in FIGURES 1 and 2) include a main inlet valve 6 and an exhaust valve 7 operating to regulate the admission of fuel and the discharge of exhaust according to a desired mode of operation. The exhaust and main inlet valves are actuated into operation by a cam 8 riding on cam shaft 9, through a push rod 10 and linkage arrangement generally designated 11. Located between the inlet portion 12 of the main inlet valve and the intake air manifold 13 is the gaseous fuel injection valve 14. This valve, as is customary, is driven by a cam 15 located on cam shaft 9. While in FIGURE 1 schematic liberty is taken to clearly show the actuation of these respective valves it is pointed out that the cam 15 is behind the cam 8 which actuates the push rod 10 and in actual practice the cam shaft driving the exhaust valve and inlet valve also drives the gaseous fuel injection valve 14.

As is well known in the art working fluid such as air is passed from the intake air manifold 13 through the conduit means generally designated 35 to the inlet portion 12 of the main inlet valve 6 fuel is supplied at the inlet portion 12 of the main inlet valve by gaseous fuel injection means 14. More particularly and to provide an arrangement of injecting fuel which eliminates the problems resulting in engines burning gaseous fuel having hydrogen content between 50% and 80%; applicant delays the admission of fuel that is being supplied by the gaseous fuel injection valve 14 until the exhaust valve has been closed for 5 to 10 degrees of cam shaft 9 rotation and admits or injects same in the vicinity of the inlet portion 12 of the main inlet valve 6.

Gaseous fuel injection valve 14 is connected to a fuel manifold generally designated 16 connected to a fuel source. Fuel passes from manifold through conduit 17 and through manually adjustable throttle cock 18 to chamber 19 of the gaseous fuel injection valve 14. According to the art valve 14 is mounted centrally between manifold 13 and inlet portion 12.

As was mentioned hereinabove gaseous fuel injection valve 14 is mounted in a spacer member 20 which comprises a portion of the conduit 35 interconnecting the intake air manifold 13 to the inlet portion 12 of the main inlet valve 6. The spacer 20 includes a housing 21 which receives valve guide 22. Valve guide 22 including a seat 23 extends into the spacer 20. A stem guide 24 is mounted in the valve guide 22 and slidably receives valve 25. A housing 26 interconnects the valve guide 22 to the valve housing 21. A spring is disposed in abutment with a washer or the like 27 connected to the valve 25. A cross head 29 operates to reciprocate the valve 25 in the stem guide 24. As is well known the cross head 29 is connected to a roller or the like 30 operated by the cam 15 on the cam shaft 9.

At the upper end of the valve guide 22 there is mounted a cap member 31 which forms a chamber 32 about the portion of the gaseous fuel injection valve which extends into the spacer 20. Passage means 33 taking the form of a tube interconnect the chamber 32 with the inlet portion 12 of the main inlet valve 6.

In this fashion when gas injection fuel valve opens the path of fuel flow is contained by cap 31 and fuel gas is caused to pass through tube 33 to a point of exit which is directly into the valve port of the cylinder 5. The end of the tube 33 is cut at an angle which provides optimum aspiration into the air inlet stream and thusly the gas injection path is as short as possible and still provides adequate mixing of the air and gas charge prior to admission into the cylinder.

In FIGURE 3 an arrangement is shown for use with a gas engine including at least two main inlet valves designated 6' and 6". As will be obvious the chamber 31 formed by the cap 32 is connected to the inlet portions of the valves 6' and 6" by separate tubes designated 33' and 33".

Although this invention has been described with reference to specific apparatus it will be appreciated that a wide variety of changes may be made within the ability of one skilled in the art without departing from the scope of this invention. For example some of the components of the apparatus may be reversed, certain features of the invention may be used independently of others, and equivalents may be substituted for the apparatus, all within the spirit and scope of the invention as defined in the appended claims.

What is claimed is:

1. A mechanism for controlling the introduction of gaseous fuel having a high hydrogen content into an internal combustion engine comprising:
    (a) a main inlet valve for introducing the fuel into the engine,
    (b) a main exhaust valve for exhausting the burned fuel from the engine,
    (c) a manifold for supplying air to the engine,
    (d) conduit means connecting the manifold and the inlet valve,
    (e) an injection valve extending into the conduit means intermediate the manifold and inlet valve and adapted to introduce the gaseous fuel therethrough to an area adjacent the inlet valve,
    (f) actuating means operatively associated with said valves and adapted to individually operate the valves so that the opening and closing of the injection valve occurs within the open period of the inlet valve a predetermined period after the exhaust valve closes whereby backfiring will be prevented.

2. The combination claimed in claim 1 wherein:
    (a) the actuating means including cams mounted on a common cam shaft and linkage means connected between the valves and cams,
    (b) the cam and linkage means associated with the injection valve adapted to open the injection valve within 5 to 10 degrees of rotation of the cam shaft after the exhaust valve closes.

3. The combination claimed in claim 1 wherein:
    (a) a cap member disposed in the conduit means above the injection valve to separate the injection valve from the air in the conduit means,
    (b) a tube member connected to the cap member and extending therefrom in the direction of and adjacent to the inlet valve.

4. A system for introducing a gaseous fuel having a high hydrogen content into the cylinder of an internal combustion engine comprising:
    (a) at least one main inlet valve for introducing the fuel into the cylinder,
    (b) a manifold for supplying air to the cylinder,
    (c) conduit means connecting the manifold and the inlet valve,
    (d) an injection valve extending into the conduit means intermediate the manifold and inlet valve,
    (e) a cap member connected to the injection valve in the conduit means to form a chamber thereabout and to separate the injection valve from the air in the conduit means,
    (f) at least one tube member disposed within the conduit means and connected to the cap member,
    (g) the tube member adapted to deliver the fuel adjacent to the inlet valve,
    (h) individual actuating means operatively associated with each of said valves whereby the injection valve will be opened and closed within a predetermined period after the opening and before the closing of the main valve whereby backfiring will be prevented.

5. The combination claimed in claim 4 wherein:
    (a) a plurality of main valves operatively associated with the cylinder,
    (b) a plurality of tube members connected to the cap member,
    (c) each tube member disposed to deliver the fuel adjacent to a corresponding inlet valve.

References Cited in the file of this patent

UNITED STATES PATENTS

| | | |
|---|---|---|
| 456,853 | Rollason et al. | July 28, 1891 |
| 1,615,249 | Watts | Jan. 25, 1927 |
| 1,910,279 | Buchi | May 23, 1933 |
| 1,936,155 | Florez | Nov. 21, 1933 |
| 2,571,713 | Hebert | Oct. 16, 1951 |
| 2,764,963 | Kauffmann | Oct. 2, 1956 |
| 2,995,123 | Gaschel | Aug. 8, 1961 |

FOREIGN PATENTS

| | | |
|---|---|---|
| 916,350 | France | Aug. 19, 1946 |